United States Patent
Sun et al.

(10) Patent No.: US 10,689,502 B2
(45) Date of Patent: Jun. 23, 2020

(54) PROCESSES FOR PREPARING CABLES WITH A CROSSLINKED INSULATION LAYER AND CABLES FOR SAME

(71) Applicant: Dow Global Technologies LLC, Midland, MI (US)

(72) Inventors: Yabin Sun, Shanghai (CN); Timothy J. Person, Pottstown, PA (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 240 days.

(21) Appl. No.: 15/575,121

(22) PCT Filed: May 22, 2015

(86) PCT No.: PCT/CN2015/079610
§ 371 (c)(1),
(2) Date: Nov. 17, 2017

(87) PCT Pub. No.: WO2016/187755
PCT Pub. Date: Dec. 1, 2016

(65) Prior Publication Data
US 2018/0142080 A1    May 24, 2018

(51) Int. Cl.
| | |
|---|---|
| C08K 5/12 | (2006.01) |
| C08L 23/06 | (2006.01) |
| H01B 3/44 | (2006.01) |
| C08K 5/14 | (2006.01) |
| C08K 5/3492 | (2006.01) |
| C08K 5/00 | (2006.01) |

(52) U.S. Cl.
CPC .............. *C08K 5/12* (2013.01); *C08K 5/14* (2013.01); *C08K 5/34922* (2013.01); *C08L 23/06* (2013.01); *H01B 3/441* (2013.01); *C08K 5/0025* (2013.01); *C08K 2201/014* (2013.01)

(58) Field of Classification Search
CPC .......... C08K 5/0025; C08K 5/12; C08K 5/14; C08K 5/34922; C08K 2201/014; C08L 23/06; H01B 3/441
See application file for complete search history.

(56) References Cited

U.S. PATENT DOCUMENTS

| | | | |
|---|---|---|---|
| 5,346,961 A | | 9/1994 | Shaw et al. |
| 6,086,792 A | * | 7/2000 | Reid .................. H01B 1/24 174/102 SC |
| 8,247,696 B2 | | 8/2012 | Smedberg et al. |
| 8,399,049 B2 | | 3/2013 | Laurenson et al. |
| 8,650,742 B2 | | 2/2014 | Smedberg |
| 2008/0182935 A1 | * | 7/2008 | Smedberg ................. C08J 3/24 524/571 |
| 2010/0101823 A1 | * | 4/2010 | Eaton ...................... H01B 3/18 174/110 SR |
| 2010/0181095 A1 | * | 7/2010 | Smedberg ............ C08K 5/0025 174/120 SC |
| 2011/0097898 A1 | * | 4/2011 | Kjellqvist ................ H01B 1/24 438/660 |
| 2011/0162869 A1 | * | 7/2011 | Smedberg ............. C08F 210/02 174/120 SR |
| 2013/0000947 A1 | * | 1/2013 | Smedberg ............. C08F 210/02 174/110 SR |
| 2013/0081854 A1 | | 4/2013 | Englund et al. |
| 2013/0220666 A1 | | 8/2013 | Fagrell et al. |

FOREIGN PATENT DOCUMENTS

| | | | |
|---|---|---|---|
| AU | 2012201176 A1 | | 9/2012 |
| CN | 102725344 A | | 10/2012 |
| CN | 103756163 A | | 4/2014 |
| EP | 1070737 A1 | | 1/2001 |
| JP | 2001325834 A | * | 11/2001 |
| JP | 3602297 B2 | * | 12/2004 |
| JP | 102725344 A | * | 10/2012 |
| WO | 2009/007116 A1 | | 1/2009 |
| WO | 2013/166683 A1 | | 11/2013 |
| WO | 2014/040532 A1 | | 3/2014 |
| WO | 2014/158570 A1 | | 10/2014 |

OTHER PUBLICATIONS

Andrews, IEEE Electrical Insulation Magazine, vol. 22, No. 6, 2006.
Borlink High Productivity Product Literature.
PCT/CN2015/079610, International Search Report and Written Opinion dated Feb. 22, 2016.
PCT/CN2015/079610, International Preliminary Report on Patentability dated Dec. 7, 2017.

* cited by examiner

*Primary Examiner* — Carl J Arbes

(57) ABSTRACT

Processes for making cables and cable cores having a crosslinked insulation layer. The processes comprise (a) providing an initial cable core having a conductor, a first semiconductive layer, an initial insulation layer comprising a crosslinkable polymeric composition, and a second semiconductive layer, and (b) subjecting the initial cable core to a crosslinking process. The crosslinkable polymeric composition comprises an ethylene-based polymer, an organic peroxide, and a polyallyl crosslinking coagent. The polyallyl crosslinking coagent and the organic peroxide are present in amounts sufficient to provide an allyl-to-active oxygen molar ratio of less than 1.2.

9 Claims, 1 Drawing Sheet

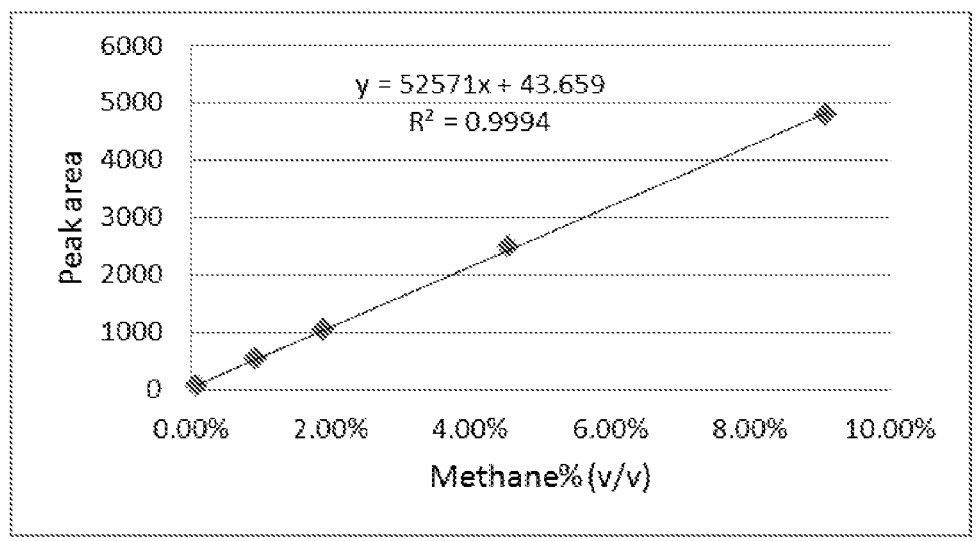

PROCESSES FOR PREPARING CABLES WITH A CROSSLINKED INSULATION LAYER AND CABLES FOR SAME

FIELD

Various embodiments of the present invention relate to processes for preparing cables having a crosslinked insulation layer.

INTRODUCTION

Medium, high, and extra-high voltage ("MV," "HV," and "EHV") cables typically contain a peroxide-crosslinked ethylene-based polymer material as an insulation layer. Although crosslinking provides valuable improvement in thermomechanical properties of the material, the peroxide used for crosslinking creates byproducts that require removal from the material after it is formed into an insulation layer (e.g., by degassing) but before a jacketing layer is placed over the insulation layer. In the case of dicumyl peroxide, these byproducts include methane, acetophenone, alpha methylstyrene, and cumyl alcohol. To reduce the amount of byproducts, the use of crosslinking coagents has been investigated, which can be used to lower the amount of peroxide employed for crosslinking. Although advances in such coagents have been achieved, improvements are still desired.

SUMMARY

One embodiment is a process for preparing a cable core having a crosslinked insulation layer, said process comprising:

(a) providing an initial cable core comprising:
  (i) a conductor;
  (ii) a first polymeric semiconductive layer;
  (iii) an initial insulation layer comprising a crosslinkable polymeric composition which comprises an ethylene-based polymer, an organic peroxide, and a polyallyl crosslinking coagent;
  (iv) a second polymeric semiconductive layer; and
(b) subjecting said initial cable core to a crosslinking process sufficient to crosslink at least a portion of said crosslinkable polymeric composition to thereby produce said cable core having a crosslinked insulation layer, wherein said polyallyl crosslinking coagent and said organic peroxide are present in said crosslinkable polymeric composition in amounts sufficient to provide an allyl-to-active oxygen molar ratio of less than 1.2, based on the allyl content of said polyallyl crosslinking coagent and the active oxygen content of said organic peroxide, wherein when said crosslinked insulation layer is subjected to a degassing process at 70° C. and standard pressure, said crosslinked insulation layer exhibits a reduction in degassing time of at least 50% to reach a methane content of 200 ppm relative to a reference crosslinked insulation layer having the same composition except that the reference crosslinked insulation layer contains no polyallyl crosslinking coagent and twice the amount of organic peroxide on a weight basis.

BRIEF DESCRIPTION OF THE DRAWINGS

Reference is made to the accompanying drawing in which:

FIG. 1 is a plot of peak area versus methane percent used as a calibration curve for methane quantification.

DETAILED DESCRIPTION

Various embodiments of the present invention concern processes for preparing a cable having a cable core. The cable cores comprise (a) a conductor, (b) a first polymeric semiconductive layer, (c) a crosslinked insulation layer, which is prepared from a crosslinkable polymeric composition, and (d) a second polymeric semiconductive layer. The process comprises subjecting an initial cable core to a crosslinking process to thereby crosslink at least a portion of the crosslinkable polymeric composition. Thereafter, the cable core containing a crosslinked insulation layer can be subjected to a degassing process. The crosslinkable polymeric compositions used herein can provide for shortened degassing times relative to conventional crosslinkable compositions. Further embodiments concern cables prepared by these processes.

Crosslinkable Polymeric Composition

As just noted, the cable cores provided herein contain a crosslinked insulation layer which is prepared from a crosslinkable polymeric composition. The crosslinkable polymeric composition comprises an ethylene-based polymer, an organic peroxide, and a polyallyl crosslinking coagent.

As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the weight of the interpolymer. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/butene, ethylene/1-hexene, ethylene/1-octene, ethylene/styrene, ethylene/propylene/1-octene, ethylene/propylene/butene, ethylene/butene/1-octene, and ethylene/butene/styrene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94. In various embodiments, the ethylene-based polymer is a high-pressure LDPE having a density of at least 0.915 g/cm$^3$, but less than 0.94 or less than 0.93 g/cm$^3$. Polymer densities provided herein are determined according to American Society for Testing and Materials ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (a.k.a., $I_2$). Generally, LDPEs have a broad molecular weight distribution ("MWD") resulting in a high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging 0.916 to 0.925 g/cm$^3$. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index ($I_2$) ranging from 0.1 to 20 g/10 min., or from 0.3 to 5 g/10 min.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}$:1 to $10^{-1}$:1, or from $10^{-9}$:1 to $10^{-5}$:1.

As noted above, an organic peroxide is employed as a component of the crosslinkable polymeric composition. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, the term "hydrocarbyl" denotes a univalent group formed by removing a hydrogen atom from a hydrocarbon (e.g. ethyl, phenyl). As used herein, the term "hydrocarbylene" denotes a divalent group formed by removing two hydrogen atoms from a hydrocarbon. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms, or any two of R, $R^1$, and $R^2$ can have the same number of carbon atoms while the third has a different number of carbon atoms.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(t-butyl-peroxy isopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; butyl 4,4-di(tert-butylperoxy)valerate; di(isopropylcumyl) peroxide; di-t-amyl peroxide, and mixtures of two or more thereof. In one or more embodiments, the organic peroxide can be selected from DCP, BIPB, or combinations thereof. In various embodiments, only a single type of organic peroxide is employed. In an embodiment, the organic peroxide is DCP. In another embodiment, the organic peroxide is BIPB.

As noted above, the crosslinkable polymeric composition further includes a polyallyl crosslinking coagent. As used herein, "polyallyl" denotes a compound having at least two pendant allyl functional groups. In various embodiments, the crosslinking coagent is a triallyl compound. In certain embodiments the crosslinking coagent is selected from the group consisting of triallyl isocyanurate ("TAIC"), triallyl cyanurate ("TAC"), triallyl trimellitate ("TATM"), and mixtures of two or more thereof. In an embodiment, the crosslinking coagent is TAIC.

In various embodiments, the polyallyl crosslinking coagent constitutes all or substantially all of crosslinking coagents present in the crosslinkable polymeric composition. In some embodiments, the crosslinkable polymeric composition is free or substantially free of nitroxide compounds (e.g., (2,2,6,6-tetramethylpiperidin-1-yl)oxyl, or "TEMPO"). As used herein, "substantially free" denotes a concentration of less than 10 parts per million by weight based on the entire weight of the cross-linkable polymeric composition. In one or more embodiments, the cross-linkable polymeric composition is free or substantially free of vinyl-functional esters. In various embodiments, the cross-linkable polymeric composition is free or substantially free of acrylate compounds. In one or more embodiments, the cross-linkable polymeric composition is free or substantially free of di-vinyl benzene compounds. In various embodiments, the cross-linkable polymeric composition is free or substantially free of alkadiene, alkatriene, and/or alkatetraene compounds.

In various embodiments, the crosslinkable polymeric composition can comprise the ethylene-based polymer in an amount ranging from 50 to 98.9 wt %, from 80 to 98.9 wt %, from 90 to 98.9 wt %, or from 95 to 98.9 wt %, based on the entire crosslinkable polymeric composition weight. In certain embodiments, the ethylene-based polymer is present at a concentration ranging from 95.6 to 99.6 wt %, or from 97.5 to 98.5 wt %, based on the combined weight of the ethylene-based polymer, the organic peroxide, and the polyallyl crosslinking coagent. Additionally, the cross-linkable polymeric composition can comprise the organic peroxide in an amount of less than 1.1 wt %, or in an amount ranging from 0.1 to less than 1.1 wt %, from 0.4 to less than 1.1 wt %, from 0.4 to 1.0 wt %, from 0.5 to 1.0 wt %, or from 0.7 to less than 1.0 wt %, based on the entire crosslinkable polymeric composition weight. Furthermore, the crosslinkable polymeric composition can comprise the polyallyl crosslinking coagent in an amount of at least 0.3 wt %, or in an amount ranging from 0.3 to 3 wt %, from 0.3 to 2 wt %, from 0.3 to 1 wt %, from 0.3 to 0.7 wt %, or from 0.3 to 0.45 wt % based on the entire crosslinkable polymeric composition weight.

In various embodiments, the polyallyl crosslinking coagent and the organic peroxide can be present in a weight ratio of less than 1.0, less than 0.8, or in the range of from 0.2 to 0.7, or from 0.3 to 0.65 crosslinking coagent/organic peroxide.

In various embodiments, the polyallyl crosslinking coagent and organic peroxide can be present in amounts sufficient to achieve a molar ratio of allyl groups to active oxygen atoms of less than 1.2, less than 1.1, 1.0 or less, or in the range of from 0.3 to less than 1.2, from 0.4 to 1.1, or from 0.5 to 1.0. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl crosslinking coagent that are not covalently bonded to another oxygen atom are not considered active oxygen atoms. Additionally, only pendant allyl groups found on the polyallyl crosslinking coagent are included in the molar ratio of allyl groups/active oxygen atoms. The allyl-to-active oxygen molar ratio is calculated as follows:

$$\frac{(\text{moles polyallyl coagent})(\text{number of allyl groups per coagent molecule})}{(\text{moles peroxide})(\text{number of active oxygen atoms per peroxide molecule})}$$

Though not wishing to be bound by theory, the inventors have discovered that when the polyallyl coagent is employed in higher concentrations than those listed, the coagent tends to sweat out of the crosslinkable polymeric composition at a higher rate. Additionally, it appears that such sweat out of the coagent may increase the amount of migration of other components, such as the organic peroxide and additives (e.g., antioxidants). Accordingly, in various embodiments, the crosslinkable polymeric composition can exhibit a coagent sweat out after being stored at 23° C. for two weeks that is at least 25%, at least 35%, or at least 50% less than the coagent sweat out of an identical reference crosslinkable polymeric composition except that the reference crosslinkable polymeric composition has an allyl-to-active oxygen molar ratio of 1.2. Sweat out of the crosslinkable polymeric composition is determined using pelletized samples according to the procedure provided in the Test Methods section, below. Similarly the crosslinkable polymeric composition can exhibit a coagent sweat out after being stored at 23° C. for two weeks that is at least 25%, at least 35%, or at least 50% less than the coagent sweat out of an identical reference crosslinkable polymeric composition except that the reference crosslinkable polymeric composition has an allyl-to-active oxygen molar ratio of 1.6. Additionally, when an antioxidant is employed, the crosslinkable polymeric composition can exhibit an antioxidant sweat out after being stored at 23° C. for two weeks that is at least 5%, at least 10%, or at least 15% less than the antioxidant sweat out of an identical reference crosslinkable polymeric composition except that the reference crosslinkable polymeric composition has an allyl-to-active oxygen molar ratio of 1.2. Similarly, when an antioxidant is employed, the crosslinkable polymeric composition can exhibit an antioxidant sweat out after being stored at 23° C. for two weeks that is at least 5%, at least 10%, or at least 15% less than the antioxidant sweat out of an identical reference crosslinkable polymeric composition except that the reference crosslinkable polymeric composition has an allyl-to-active oxygen molar ratio of 1.6. Moreover, the crosslinkable polymeric composition can exhibit an organic peroxide sweat out after being stored at 23° C. for two weeks that is at least 10%, at least 20%, or at least 40% less than the organic peroxide sweat out of an identical reference crosslinkable polymeric composition except that the reference crosslinkable polymeric composition has an allyl-to-active oxygen molar ratio of 1.2. Similarly, the crosslinkable polymeric composition can exhibit an organic peroxide sweat out after being stored at 23° C. for two weeks that is at least 10%, at least 20%, or at least 40% less than the organic peroxide sweat out of an identical reference crosslinkable polymeric composition except that the reference crosslinkable polymeric composition has an allyl-to-active oxygen molar ratio of 1.6. In each of the foregoing embodiments, the crosslinkable polymeric composition can have an allyl-to-active oxygen molar ratio of 1.0 or less, or from 0.5 to 1.0.

The crosslinkable polymeric composition may also contain other additives including, but not limited to, processing aids, fillers, carbon black, nanoparticles, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

Additionally, an antioxidant can be employed with the crosslinkable polymeric composition. Exemplary antioxidants include hindered phenols (e.g., tetrakis [methylene (3,5-di-t-butyl-4-hydroxyhydrocinnamate)] methane); phosphites and phosphorites (e.g., tris (2,4-di-t-butylphenyl) phosphate); thio compounds (e.g., dilaurylthiodipropionate); various siloxanes; and various amines (e.g., polymerized 2,2,4-trimethyl-1,2-dihydroquinoline). Antioxidants can be used in amounts of 0.01 to 5 wt % based on the total weight of the cross-linkable polymeric composition. In the formation of wire and cable compositions, discussed below, antioxidants are typically added to the system before processing (i.e., prior to extrusion and cross-linking) of the finished article.

In various embodiments, the crosslinkable polymeric composition can be free or substantially free of polyalkylene glycols. In various embodiments, the crosslinkable polymeric composition can be free or substantially free of elastomeric polymers. In various embodiments, the cross-linkable polymeric composition can be free or substantially free of carboxylic acid/ester-modified polymers (e.g., ethylene/ethyl acrylate copolymers).

Preparation of the crosslinkable polymeric composition can comprise compounding the above-described components. For example, compounding can be performed by either (1) compounding all components into the ethylene-based polymer, or (2) compounding all the components except for the organic peroxide, which is soaked in as described below. Compounding of the components for the crosslinkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C. In various embodiments, soaking the organic peroxide into the ethylene-based polymer can be performed at a temperature ranging from 30 to 100° C., from 50 to 90° C., or from 60 to 80° C.

Alternatively, in one or more embodiments, the organic peroxide and the polyallyl crosslinking coagent can be soaked into the ethylene-based polymer, either simultaneously or sequentially. In an embodiment, the organic peroxide and polyallyl crosslinking coagent can be premixed at the temperature above the melting temperature of the organic peroxide and polyallyl crosslinking coagent, whichever is greater, followed by soaking the ethylene-based polymer in the resulting mixture of the organic peroxide and polyallyl crosslinking coagent at a temperature ranging from 30 to 100° C., from 50 to 90° C., or from 60 to 80° C., for a period of time ranging from 1 to 168 hours, from 1 to 24 hours, or from 3 to 12 hours. In another embodiment, the ethylene-based thermoplastic polymer can be soaked in the organic peroxide at a temperature ranging from 30 to 100° C., from 50 to 90° C., or from 60 to 80° C., for a period of time ranging from 1 to 168 hours, from 1 to 24 hours, or from 3 to 12 hours, followed by soaking the ethylene-based polymer in polyallyl crosslinking coagent at a temperature ranging from 30 to 100° C., from 50 to 90° C., or from 60 to 80° C., for a period of time ranging from 1 to 168 hours, from 1 to 24 hours, or from 3 to 12 hours. In still another embodiment, the ethylene-based polymer can be soaked in the polyallyl crosslinking coagent at a temperature ranging from 30 to 100° C., from 50 to 90° C., or from 60 to 80° C., for a period of time ranging from 1 to 168 hours, from 1 to 24 hours, or from 3 to 12 hours, followed by soaking the ethylene-based polymer in organic peroxide at a temperature ranging from 30 to 100° C., from 50 to 90° C., or from 60 to 80° C., for a period of time ranging from 1 to 168 hours, from 1 to 24 hours, or from 3 to 12 hours. In yet another embodiment, the ethylene-based polymer can be soaked in organic peroxide and polyallyl crosslinking coagent without premixing at a temperature ranging from 30 to 100° C., from 50 to 90° C., or from 60 to 80° C., for a period of time ranging from 1 to 168 hours, from 1 to 24 hours, or from 3 to 12 hours.

Semiconductive Layers

As noted above, the cable core comprises first and second polymeric semiconductive layers. The first polymeric semiconductive layer is typically interposed between the insulation layer comprising the crosslinkable polymeric composition and the conductor, while the second polymeric semiconductive layer surrounds the insulation layer comprising the crosslinkable polymeric composition. The first and second polymeric semiconductive layers can have the same or different compositions. Additionally, each polymeric semiconductive layer may be crosslinked and, as such, may initially comprise crosslinkable polymeric compositions.

Polymeric semiconductive materials are well known in the art, and any known or hereafter discovered polymeric semiconductive materials may be employed herein. In general, however, each polymeric semiconductive layer contains a polymer, a conductive filler, and optionally one or more additives. Polymers suitable for use in either or both of the polymeric semiconductive layers include, but are not limited to, ethylene-based polymers (such as those described above), ethylene ethylacrylate copolymer ("EEA"), ethylene butylacrylate copolymer ("EBA"), ethylene vinyl acetate copolymer ("EVA"), polyolefin elastomers, and combinations of two or more thereof. Conductive fillers, which can be present in an amount ranging from 1 to 50 wt % based on the total weight of the respective semiconductive layer, include conductive carbon blacks, conductive carbons (e.g., carbon fiber, carbon nanotubes, graphene, graphites, and expanded graphite platelets), and metal particles. Optional additives include any of those additives listed above as suitable for use in the crosslinkable polymeric composition (e.g., antioxidants, stabilizers, and processing aids). Additives may be employed in conventional concentrations.

Preparation of the Cable Core

The initial cable core containing inner and outer semiconductive and insulation layers can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

Following extrusion, the resulting initial cable core can undergo a crosslinking process to crosslink the insulation and both inner and outer semiconductive layers. For example, the initial cable core can be passed into a heated cure zone downstream of the extrusion die. The heated cure zone can be maintained at a temperature in the range of about 150 to about 350° C., or in the range of about 170 to about 250° C. The heated cure zone can be heated by pressurized steam, or inductively heated pressurized nitrogen gas. Following the crosslinking process, the cable core having a crosslinked insulation, inner, and outer semiconductive layers can be cooled (e.g., to room temperature).

Degassing

The crosslinking process can create volatile decomposition byproducts in the crosslinked insulation layer. The term "volatile decomposition products" denotes decomposition products formed during the curing step, and possibly during the cooling step, by decomposition and reaction of the free radical generating agent (e.g., dicumyl peroxide). Such byproducts can comprise alkanes, such as methane. Additional byproducts can include alcohols. Such alcohols can comprise the alkyl, aryl, alkaryl, or aralkyl moieties of the above-described organic peroxide. For instance, if dicumyl peroxide is employed as a crosslinking agent, the byproduct alcohol is cumyl alcohol. Other decomposition products can include ketone byproducts from the above-described organic peroxide. For example, acetophenone is a decomposition byproduct of dicumyl peroxide.

Following crosslinking, the crosslinked insulation layer can undergo degassing to remove at least a portion of volatile decomposition byproducts. Degassing can be performed at a degassing temperature, a degassing pressure, and for a degassing time period to produce a degassed cable core. In various embodiments, the degassing temperature can range from 50 to 150° C., or from 60 to 80° C. In an embodiment, the degassing temperature is 65 to 75° C. Degassing can be conducted under standard atmospheric pressure (i.e., 101,325 Pa).

Employing a polyallyl crosslinking coagent can decrease the amount of time required to degas the crosslinked insulation layer while maintaining cure potential. In various embodiments, when the crosslinked insulation layer is subjected to a degassing process at 70° C. and standard pressure, the crosslinked insulation layer can exhibit a reduction in degassing time of at least 50%, at least 55%, at least 60%, or at least 65% to reach a methane content of 200 ppm relative to a reference crosslinked insulation layer having the same composition except that the reference crosslinked insulation layer contains no polyallyl crosslinking coagent and twice the amount of organic peroxide on a weight basis. Additionally, when the crosslinked insulation layer is subjected to a degassing process at 70° C. and standard pressure, the crosslinked insulation layer can exhibit a reduction in degassing time of at least 40%, at least 45%, or at least 50%, to reach a methane content of 150 ppm relative to the reference crosslinked insulation layer. Furthermore, when the crosslinked insulation layer is subjected to a degassing process at 70° C. and standard pressure, the crosslinked insulation layer can exhibit a reduction in degassing time of at least 30%, at least 35%, or at least 40%, to reach a methane content of 93 ppm relative to the reference crosslinked insulation layer.

In an embodiment, the crosslinked insulation layer can have a cure potential (maximum torque, or MH) that is at least 70%, at least 75%, at least 80%, at least 85%, at least 90%, or at least 95% of the cure potential of the reference crosslinked insulation layer.

Definitions

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Wire" means a single strand of conductive metal, e.g., copper or aluminum, or a single strand of optical fiber.

"Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496, 629 and 6,714,707.

"Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

"Residue," when referring to a monomer, means that portion of a monomer molecule which resides in a polymer molecule as a result of being polymerized with another monomer or comonomer molecule to make the polymer molecule.

"Hydrocarbyl" denotes a univalent group formed by removing a hydrogen atom from a hydrocarbon (e.g., ethyl or phenyl).

Test Methods

Density

Density is determined according to ASTM D792.

Melt Index

Melt index, or $I_2$, is measured in accordance with ASTM D1238, condition 190° C./2.16 kg, and is reported in grams eluted per 10 minutes. The $I_{10}$ is measured in accordance with ASTM D 1238, condition 190° C./10 kg, and is reported in grams eluted per 10 minutes.

Moving Die Rheometer

Moving die rheometer ("MDR") testing is conducted at 180° C. according to the methods described in ASTM D5289 on an Alpha Technologies MDR 2000. MDR is employed to determine cure potential ("MH") and crosslink density ("MH-ML").

Hot Creep

Hot creep is determined according to International Electrotechnical Commission ("IEC") standards 60811-1-2 and 60811-2-1. Dumb-bell-shaped test pieces having 1-mm thickness are collected from the inner, middle, and outer layers of the insulation. A 20-N/cm² load is put on each test piece, which is then placed into oven at 200° C. for 15 minutes. Elongation is then measured.

Sweat Out

Sweat out is determined according to the following method.
1. Following the storage period (e.g., 2 weeks at 23° C.), weigh 3.000±0.001 g pellet sample and place into a 40-mL vial.
2. Feed 14.5 mL acetonitrile (ACN) into the 40-mL vial.
3. Seal the 40-mL vial and shake by a shaker for 5 minutes.
4. Collect the liquid from the 40-mL vial in a 2-mL sample vial for HPLC analysis using the following parameters.

| LC Parameter | Details |
| --- | --- |
| Column | Agilent Extend-C18, 5 µm particle, 4.6 mm × 150 mm column |
| Column Oven | 40 C. |
| Flow rate | 1.000 ml/min |
| Injection volume | 10 µL |
| Detector | UV absorbance at 210 nm |
| Mobile Phase A | Water; |
| Mobile Phase B | Acetonitrile |
| Stop Time | 18 min |

| Time/min | B % | Flow Rate(ml/min) |
| --- | --- | --- |
| 0.00 | 60 | 1.000 |
| 8.00 | 80 | 1.000 |
| 10.00 | 95 | 1.000 |
| 12.00 | 100 | 1.000 |
| 12.10 | 60 | 1.000 |

Methane Content Analysis
For Cable Samples

Two 110 kV/800 mm² cable cores are prepared (S1 and CS1, described below). Both cable cores are degassed in a degassing chamber at 70° C. and standard pressure. Cut 30-cm cable-core samples from a drum of cable after degassing for 0, 1, 2, 3, and 5 days. Seal each sample in a TEDLAR™ PVF sampling bag immediately and vacuum for methane measurements. Weight loss is measured on a 400-mm fresh cable heating in an oven at 70° C. for different periods of time.

Methane content is determined using multiple headspace extraction and gas chromatography for the cable samples under the following conditions.

| Instrumentation | |
| --- | --- |
| Gas chromatograph | Agilent 6890 |
| Column | HP-5MS, 30 m × 0.25 mm ID × 0.25 µm film, 19091S-433 5% phenyl methyl siloxane |
| Carrier gas (EPC) | Nitrogen, 2.0 mL/min |
| Inlet temperature | 250° C. |
| Split ratio | 20:1 |
| Flow mode | Constant flow |
| FID temperature | 250° C. |
| Oven Program | 60° C., hold for 13 min; ramp to 300° C. at a rate of 30° C./min; hold for 0 minutes. (21 min in all) |
| Detector | FID @ 250° C.; Hydrogen 40 mL/min; Air 450 mL/min; Make up (Nitrogen) 30 mL/min |

Calibration Curve

Before collecting the standard methane in gas cylinder, a 1-L gas bag is flushed with pure nitrogen 3 times and then deflated thoroughly with an automatic gas pump. A rubber tube is connected to the outlet of a methane gas cylinder while another end of the tube is put in a fume hood. Then the cylinder valve is opened and the tube is flushed with methane for around 15 seconds. After that, the other end of rubber tube is connected to the inlet of the gas bag with the cylinder valve open. By opening the inlet valve of the gas bag, the gas bag is inflated with pure methane gas from the cylinder.

To prepare the gas standards having different methane concentrations, washed and deflated 3-L gas bags and 22-mL Agilent headspace vials are used. Around 500 mL pure nitrogen gas is pumped into the 3-L gas bag, and the actual volume is calculated by the pumping time and the flow rate. Specific volumes of pure methane gas are accurately drawn with syringe and injected into the gas bags and headspace vials to prepare the methane gas standards. The calibration curve is provided in FIG. 1.

Procedures
i) An empty 10-L gas bag is flushed with nitrogen 2 or 3 times and then filled with nitrogen. Nitrogen in this gas bag is then to be transferred into the gas bags with cable samples in the following procedures.
ii) After receiving the gas bag samples (with cable in), a measured volume of nitrogen gas is filled into the gas bag. Then the gas sample is directly analyzed by GC/FID with manual injection for quantification of the methane concentration released during the storage and transportation (Day 0 result). Then the gas is totally removed from the gas bag with the pump, and the time and flow rate is recorded for calculating the volume.
iii) Pure nitrogen gas is filled into the same gas bag again and then conditioned in an oven at 70° C. for 22 hours. After taking the gas bag with the cable sample out of the oven and letting it cool down to the room temperature, methane concentration released during the 70° C. conditioning is analyzed by GC/FID with manual injection (Day 1 result). Then the gas is totally removed from the gas bag with the pump, and the time and flow rate is recorded for calculating the volume.
iv) Step (iii) is repeated three times later to get the results for Day 2, Day 3 and Day 4.
v) MHE model is used to calculate the total methane in the cable sample and the original methane concentration.

Multiple Headspace Extraction

The method used in this study is a combination of multiple headspace extraction with sampling from a gas bag. The gas bag is used for sample preparation and MHE is the methodology used for quantification. MHE assumes that all of the analyte will be extracted thoroughly from the sample after unlimited headspace extraction steps. The theoretical value of the total amount is calculated by the following formula:

$$\ln A_n = -K(n-1) + \ln A_1 \sum_{n=1}^{\infty} A_n = A_1/(1-e^{-K})$$

To calculate the total value by this formula, only two parameters are needed, $A_1$ and K. $A_1$ is the peak area or analyte amount of the first extraction. K is the slope of a linear relationship predicted between the sequence number of extraction and the corresponding natural logarithm of peak area or analyte amount. If the sample is a suitable system for application of multiple headspace extraction, a good fit will be observed between extraction number and the logarithm of peak area.

Quantification of Methane in Cable

The methane volume (mL) released from the cable sample after 22 hours heating is used for MHE calculation, from the Day 1 result to Day 4 result. The methane volume is calculated by:

$$V = (F*t)*Conc._{(methane)}$$

"F" is the average flow rate (mL/min) recorded by the flow meter, and "t" is time (min) of pumping for deflating the gas bag. "Conc.$_{(methane)}$" is the volume concentration (mL/mL) of methane calculated by the calibration curve in FIG. 1. The Day 0 result is not included in MHE calculation as it is the methane released before the first conditioning of cable sample, so the total volume of methane in the cable is:

$$V_{total} = \sum_{n=1}^{\infty} V_n + V_0$$

For Plaque Samples

Methane content for plaque samples is determined using the same method as described above for cable samples, with the following exceptions.

Compression Molding

Plaque samples are prepared by compression molding as follows:

1. Put about 30 g of sample into a 1-mm thickness mold between two PET films. Then put this loaded mold into a hot press machine (LabTech).
2. Preheating at 120° C. for 10 minutes.
3. Venting for 8 times and 0.2 s for each.
4. Close the platens to apply 15 MPa pressure to mold for 20 minutes. Meanwhile increase the temperature to 182° C. within 6.5 minutes.
5. Keep a continued 15 MPa on the mold and cooling to 24° C.
6. Take out the mold from machine.

Headspace GC Sampling

1. Remove the cured plaque with two PET films adhered on both sides from mold
2. Peel off the PET film quickly.
3. Cut out two sheets of the plaque's center area (0.3 g), and put them into two headspace GC vials, then seal the vials immediately. ~30 seconds from step 2 to 3
4. Weigh the sealed GC headspace vial, and the sample weight could be calculated by the difference between the empty vial and the vial with sample.

GC Conditions for Plaque Analyses

| Instrumentation | |
|---|---|
| Gas chromatograph | Agilent 6890 |
| Injection port | Split/splitless |
| Column | DB-5MS, 30 m × 0.32 mm × 1.0 mm |
| Detector | FID |
| Sample introduction | G1888 |
| Data collection | ChemStation |

| G1888 Headspace Conditions | |
|---|---|
| GC cycle time | 30 minutes |
| Oven temperature | 150° C. |
| Loop temperature | 180° C. |
| Transfer line temperature | 190° C. |
| Vial equilibration time | 30 minutes |
| Shaking speed | Off |
| Loop fill time | 0.20 minutes |
| Loop equilibration time | 0.10 minutes |
| Inject time | 0.50 minutes |
| Pressurization time | 0.50 minutes |
| Advance functions | Multi HS EXT on; 5 extractions per vial |

| 6890 GC Conditions | |
|---|---|
| Carrier gas (EPC) | Nitrogen, 2.0 mL/min |
| Inlet temperature | 300° C. |
| Split ratio | 1:50 |
| Flow mode | Constant flow |
| Aux 5 | 15 psi |
| FID temperature | 300° C. |
| Oven Program | 50° C., hold for 3 min; ramp to 280° C. at a rate of 15° C./min; hold for 2 minutes. (20.3 min in all) |
| Detector | FID @ 300° C.; Hydrogen 40 mL/min; Air 450 mL/min; Make up (Nitrogen) 45 mL/min |

Degassing

The plaques are put into an oven at 60° C. for degassing. Samples are collected after 5 minutes, 10 minutes, and 20 minutes. They are then sealed in vials for headspace GC analysis.

Materials

The following materials are employed in the Examples, below.

The low-density polyethylene ("LDPE") employed has a density of 0.92 g/cm³, a melt index ($I_2$) of 2 g/10 min., and is produced by The Dow Chemical Company, Midland, Mich., USA.

BORLINK™ LE4201S is a crosslinkable LDPE having a density of 0.92 g/cm³, a melt index ($I_2$) of 2 g/10 min, and contains 1.9 wt % dicumyl peroxide. It is commercially available from Borealis AG, Vienna, Austria.

The dicumyl peroxide ("DCP") is commercially available from Fang Rui Da Chemical Company, and is used as received.

The bis(t-butyl-peroxy isopropyl)benzene ("BIPB") is commercially available from Fang Rui Da Chemical Company, and is used as received.

The triallyl isocyanurate ("TAIC") is commercially available from Fang Rui Da Chemical Company, and is used as received.

The triallyl trimellitate ("TATM") is commercially available from Fang Rui Da Chemical Company, and is used as received.

The triallyl cyanurate ("TAC") is commercially available from Fang Rui Da Chemical Company, and is used as received.

The trimethylolpropane trimethylacrylate ("TMPTMA") is commercially available from Sartomer, and is used as received.

LOWINOX™ TBM-6 is a commercially available antioxidant having the chemical name 4,4'-thiobis(2-t-butyl-5-methylphenol), available from Chemtura. It is used as received.

IRGANOX™ 1010 is a commercially available antioxidant having the chemical name pentaerythritol tetrakis(3-(3,5-di-t-butyl-4-hydroxyphenyl)propionate), available from BASF. It is used as received.

IRGANOX™ 1076 is a commercially available antioxidant having the chemical name octadecyl-3-(3,5-di-tert.butyl-4-hydroxyphenyl)-propionate, available from BASF. It is used as received.

IRGANOX™ 245 is a commercially available antioxidant having the chemical name triethylene glycol bis(3-tert-butyl-4-hydroxy-5-methylphenyl)propionate, available from BASF. It is used as received.

IRGANOX™ 1035 is a commercially available antioxidant having the chemical name thiodiethylene bis[3-(3,5-di-tert-butyl-4-hydroxy-phenyl)propionate], available from BASF. It is used as received.

IRGANOX™ PS802 is a commercially available antioxidant having the chemical name dioctadecyl 3,3'-thiodipropionate, available from BASF. It is used as received.

CYANOX™ 1790 is a commercially available antioxidant having the chemical name 1,3,5-tris(4-tert-butyl-3-hydroxy-2,6-dimethylbenzyl)-1,3,5-triazine-2,4,6-trione, available from Cytec Industries. It is used as received.

Distearyl thiodipropionate ("DSTDP") is a commercially available antioxidant available from Cytec. It is used as received.

UVINUL™ 4050 is a commercially available UV stabilizer having the chemical name 1,6-hexamethylenebis[N-formyl-N-(2,2,6,6-tetramethylpiperidin-4-yl)amine], available from BASF. It is used as received.

ENDURANCE™ HFDA-0801 BK EC is a polyethylene-copolymer-based crosslinkable semiconductive shielding compound having a density of 1.05 g/cm$^3$ that is commercially available from The Dow Chemical Company. It is used as received.

ENDURANCE™ HFDA-0587 BK S is a crosslinkable semiconductive shielding compound having a density of 1.09 g/cm$^3$ that is commercially available from The Dow Chemical Company. It is used as received.

EXAMPLES

Example 1

Prepare two cable core samples (Sample 1, or "S1," and Comparative Sample 1, or "CS1") according to the following process. The insulation layer of S1 is LDPE comprising 0.95 wt % DCP, 0.45 wt % TAIC, 0.13 wt % DSTDP, 0.09 wt % Cyanox 1790, and 20 ppm UVINUL™ 4050. The insulation layer of CS1 is BORLINK™ LE4201S, which is LDPE comprising 1.9 wt % DCP without TAIC. The inner semiconductive layer is composed of ENDURANCE™ HFDA-0801 BK EC. The outer semiconductive layer is composed of ENDURANCE™ HFDA-0587 BK S. The conductor employed has an 800-mm$^2$ cross-section.

The cable cores are prepared on a VCV line. A 1-mm thick conductor shield (inner semiconductive layer), a 16-mm thick insulation layer, and a 1-mm insulation shield (outer semiconductive layer) are extruded and coated on the conductor having a cross-section of 800 mm$^2$ through 3 extruders, 60 mm, 175 mm and 75 mm, simultaneously. The obtained cable core is subjected to vulcanization tube for curing at 300° C. and under nitrogen atmosphere having a pressure of 10 bar.

Analyze S1 and CS1 for methane content, cure potential, and hot creep according to the above-described Test Methods. Results are provided in Table 1, below.

TABLE 1

Properties of S1 and CS1

|  | S1 | CS1 |
|---|---|---|
| Time to CH$_4$ content less than 200 ppm @ 70° C. (hours) | 18 | 54 |
| Reduction in degassing time to 200 ppm relative to CS1 (%) | 67 | — |
| Time to CH$_4$ content less than 150 ppm @ 70° C. (hours) | 33 | 69 |
| Reduction in degassing time to 150 ppm relative to CS1 (%) | 52 | — |
| Time to CH$_4$ content less than 93 ppm @ 70° C. (hours) | 65 | 111 |
| Reduction in degassing time to 93 ppm relative to CS1 (%) | 41 | — |
| Time to CH$_4$ content less than 80 ppm @ 70° C. (hours) | 75 | 120 |
| Reduction in degassing time to 80 ppm relative to CS1 (%) | 38 | — |
| Time to CH$_4$ content less than 70 ppm @ 70° C. (hours) | 92 | 129 |
| Reduction in degassing time to 70 ppm relative to CS1 (%) | 29 | — |
| MH (dN · m) | 3.25 | 3.43 |
| Hot Creep - inner insulation layer (%) | 65.0 | 65.0 |
| Hot Creep - middle insulation layer (%) | 65.0 | 70.0 |
| Hot Creep - outer insulation layer (%) | 67.5 | 70.0 |

The results provided in Table 1 show a significant reduction in degassing time for S1 with respect to methane content without sacrificing cure potential (i.e., the cure potential (MH) of S1 is nearly 95% of the cure potential of CS1).

Example 2

Prepare six Samples (S2-S7) and four Comparative Samples (CS2-CS5) according to the formulations provided in Table 2, below. S2-S7 and CS2-CS5 are prepared by first blending the LDPE and antioxidant in a Brabender mixer at 125° C. and a rotor speed of 30 rpm. The resulting compound is extruded through a single-screw extruder at 125° C. and pelletized. The pellets are soaked at 80° C. for 8 hours in peroxide or a combination of peroxide and coagent.

TABLE 2

Compositions of S2-S7 and CS2-CS5

|  | S2 | S3 | S4 | S5 | S6 | S7 | CS2 | CS3 | CS4 | CS5 |
|---|---|---|---|---|---|---|---|---|---|---|
| LDPE (wt %) | 98.60 | 98.55 | 98.60 | 98.55 | 98.50 | 98.50 | 98.15 | 98.15 | 98.15 | 98.15 |
| DCP (wt %) | 0.95 | 0.80 | 0.95 | 0.80 | 0.95 | 0.85 | 0.85 | 0.85 | 0.85 | 1.70 |
| TAIC (wt %) | — | — | 0.30 | 0.50 | — | — | 0.85 | — | — | — |

TABLE 2-continued

| Compositions of S2-S7 and CS2-CS5 | | | | | | | | | | |
|---|---|---|---|---|---|---|---|---|---|---|
| | S2 | S3 | S4 | S5 | S6 | S7 | CS2 | CS3 | CS4 | CS5 |
| TAC (wt %) | 0.30 | 0.50 | — | — | — | — | — | — | 0.85 | — |
| TATM (wt %) | — | — | — | — | 0.40 | 0.50 | — | 0.85 | — | — |
| TBM-6 (wt %) | 0.15 | 0.15 | 0.15 | 0.15 | 0.15 | 0.15 | 0.15 | 0.15 | 0.15 | 0.15 |
| Total: | 100.00 | 100.00 | 100.00 | 100.00 | 100.00 | 100.00 | 100.00 | 100.00 | 100.00 | 100.00 |
| Allyl/Active oxygen | 0.51 | 1.02 | 0.51 | 1.02 | 0.51 | 0.72 | 1.63 | 1.23 | 1.63 | — |

Analyze each of S2-S7 and CS2-CS5 according to the Test Methods provided above. Results are provided in Table 3, below.

TABLE 3

| Properties of S2-S7 and CS2-CS5 | | | | | | | | | | |
|---|---|---|---|---|---|---|---|---|---|---|
| | S2 | S3 | S4 | S5 | S6 | S7 | CS2 | CS3 | CS4 | CS5 |
| MDR PROPERTIES | | | | | | | | | | |
| ML (dN · m) | 0.17 | 0.17 | 0.17 | 0.17 | 0.17 | 0.16 | 0.17 | 0.17 | 0.17 | 0.17 |
| MH (dN · m) | 3.01 | 3.01 | 2.87 | 2.78 | 2.85 | 2.61 | 3.85 | 3.11 | 4.03 | 3.94 |
| MH − ML (dN · m) | 2.84 | 2.84 | 2.70 | 2.61 | 2.68 | 2.45 | 3.68 | 2.94 | 3.86 | 3.77 |
| METHANE CONTENT AFTER DEGASSING at 60° C. | | | | | | | | | | |
| 0.5 min. (ppm) | 340 | 293 | 330 | 316 | 332 | 289 | 326 | 290 | 326 | 653 |
| 5 min. (ppm) | 194 | 148 | 198 | 170 | 179 | 166 | 155 | 167 | 176 | 342 |
| 10 min. (ppm) | 111 | 91 | 111 | 94 | 102.5 | 90 | 94 | 97 | 94 | 182 |
| 20 min. (ppm) | 36 | 30 | 35 | 32 | 31 | 27 | 30 | 34 | 32 | 54 |
| SWEAT OUT AFTER 2 WEEKS AT 23° C. | | | | | | | | | | |
| TAIC (ppm) | — | — | 251 | 463 | — | — | 1,384 | — | — | — |
| TAC (ppm) | 217 | 393 | — | — | — | — | — | — | 1,136 | — |
| TATM (ppm) | — | — | — | — | 766 | 1,139 | — | 3,208 | — | — |
| TBM-6 (ppm) | 161 | 171 | 178 | 175 | 280 | 325 | 199 | 469 | 224 | 286 |
| DCP (ppm) | 214 | 208 | 224 | 205 | 350 | 382 | 383 | 793 | 387 | 280 |

The results provided in Table 3 show faster reduction in methane content for Samples containing a polyallyl coagent relative to CS5, which contains no polyallyl coagent. Additionally, although CS2-CS4 (which contain a polyallyl coagent) show similar degassing results as compared to S2-S7, these samples show significantly higher sweat out of the coagent. Additionally and surprisingly, CS2-CS4 show significantly higher sweat out of the peroxide and antioxidant, even though these components are present in concentrations similar to S2-S7. Thus, when the polyallyl coagent is present in lower concentrations (e.g., an allyl/active oxygen ratio of less than about 1.2), an overall reduction in sweat out for all components is observed.

Example 3

Prepare two additional Samples (S8-S9) and two additional Comparative Samples (CS6-CS7) according to the formulations provided in Table 4, below, using the same preparation method provided above in Example 2.

TABLE 4

| Compositions of S8-S9 and CS6-CS7 | | | | |
|---|---|---|---|---|
| | S8 | S9 | CS6 | CS7 |
| LDPE (wt %) | 98.95 | 98.85 | 98.47 | 98.79 |
| BIPB (wt %) | 0.60 | 0.50 | 0.53 | 1.06 |

TABLE 4-continued

| Compositions of S8-S9 and CS6-CS7 | | | | |
|---|---|---|---|---|
| | S8 | S9 | CS6 | CS7 |
| TAC (wt %) | 0.30 | 0.50 | 0.85 | — |
| TBM-6 (wt %) | 0.15 | 0.15 | 0.15 | 0.15 |
| Total: | 100.00 | 100.00 | 100.00 | 100.00 |
| Allyl/Active oxygen | 0.51 | 1.02 | 1.63 | — |

Analyze each of S8-S9 and CS6-CS7 according to the Test Methods provided above. Results are provided in Table 5, below.

TABLE 5

| Properties of S8-S9 and CS6-CS7 | | | | |
|---|---|---|---|---|
| | S8 | S9 | CS6 | CS7 |
| MDR PROPERTIES | | | | |
| ML (dN · m) | 0.17 | 0.17 | 0.16 | 0.17 |
| MH (dN · m) | 3.05 | 2.95 | 3.90 | 4.05 |
| MH − ML (dN · m) | 2.88 | 2.78 | 3.74 | 3.88 |
| METHANE CONTENT AFTER DEGASSING at 60° C. | | | | |
| 0.5 min. (ppm) | 242 | 165 | 223 | 461 |
| 5 min. (ppm) | 125 | 102 | 116 | 238 |

TABLE 5-continued

| Properties of S8-S9 and CS6-CS7 | | | | |
|---|---|---|---|---|
| | S8 | S9 | CS6 | CS7 |
| 10 min. (ppm) | 65 | 53 | 62 | 114 |
| 20 min. (ppm) | 24 | 18 | 21 | 33 |
| SWEAT OUT AFTER 2 WEEKS AT 23° C. | | | | |
| TAC (ppm) | 204 | 353 | 979 | — |
| TBM-6 (ppm) | 150 | 156 | 200 | 214 |

The results provided in Table 5 show faster reduction in methane content for Samples containing a polyallyl coagent relative to CS7, which contains no polyallyl coagent. Additionally, although CS6 (which contains a polyallyl coagent) shows similar degassing results as compared to S8-S9, this sample shows significantly higher sweat out of the coagent. Additionally, CS6 shows significantly higher sweat out of the antioxidant, even though the antioxidant is present in the same concentration as S8-S9. Thus, when the polyallyl coagent is present in lower concentrations (e.g., an allyl/active oxygen ratio of less than about 1.2), an overall reduction in sweat out for coagent and antioxidant is observed.

Example 4

Prepare seven additional Samples (S10-S16) and one additional Comparative Sample (CS8) according to the formulations provided in Table 6, below, using the same preparation method provided above in Example 2.

TABLE 6

| Compositions of S10-S16 and CS8 | | | | | | | | |
|---|---|---|---|---|---|---|---|---|
| | S10 | S11 | S12 | S13 | S14 | S15 | S16 | CS8 |
| LDPE (wt %) | 98.37 | 98.35 | 98.17 | 98.30 | 98.29 | 98.45 | 98.45 | 98.75 |
| TAIC (wt %) | 0.45 | 0.45 | 0.45 | 0.45 | 0.45 | 0.45 | 0.30 | — |
| DCP (wt %) | 0.95 | 0.95 | 0.95 | 0.95 | 0.95 | 0.95 | 1.10 | 1.10 |
| IRGANOX 1076 (wt %) | — | — | 0.29 | — | — | — | — | — |
| IRGANOX 1010 (wt %) | — | — | — | 0.16 | — | — | — | — |
| CYANOX1790 (wt %) | 0.09 | — | — | — | — | — | — | — |
| IRGANOX 245 (wt %) | — | 0.11 | — | — | — | — | — | — |
| IRGANOX 1035 (wt %) | — | — | — | — | 0.17 | — | — | — |
| IRGANOX PS802 (wt %) | 0.14 | 0.14 | 0.14 | 0.14 | 0.14 | — | — | — |
| TBM-6 (wt %) | — | — | — | — | — | 0.15 | 0.15 | 0.15 |
| Total | 100.00 | 100.00 | 100.00 | 100.00 | 100.00 | 100.00 | 100.00 | 100.00 |
| Allyl/Active oxygen | 0.77 | 0.77 | 0.77 | 0.77 | 0.77 | 0.77 | 0.44 | — |

Analyze each of S10-S16 and CS8 according to the Test Methods provided above. Results are provided in Table 7, below.

TABLE 7

| Properties of S10-S16 and CS8 | | | | | | | | |
|---|---|---|---|---|---|---|---|---|
| | S10 | S11 | S12 | S13 | S14 | S15 | S16 | CS8 |
| ML (dN · m) | 0.20 | 0.20 | 0.20 | 0.21 | 0.21 | 0.19 | 0.18 | 0.18 |
| MH (dN · m) | 3.62 | 3.62 | 3.30 | 3.71 | 3.57 | 3.31 | 3.17 | 2.21 |
| MH − ML (dN · m) | 3.42 | 3.42 | 3.10 | 3.50 | 3.36 | 3.12 | 2.99 | 2.03 |

The results provided in Table 7 show that Samples S10-S16 achieve acceptable curing potential (MH), while CS8, which has a similar peroxide content but no polyallyl coagent, does not achieve an acceptable curing potential.

Example 5

Prepare seven additional Samples (S17-S23) and one additional Comparative Sample (CS9) according to the formulations provided in Table 8, below, using the same preparation method provided above in Example 2.

TABLE 8

Compositions of S17-S23 and CS9

|  | S17 | S18 | S19 | S20 | S21 | S22 | S23 | CS9 |
|---|---|---|---|---|---|---|---|---|
| LDPE (wt %) | 98.37 | 98.35 | 98.17 | 98.30 | 98.29 | 98.45 | 98.45 | 98.45 |
| TAC (wt %) | 0.45 | 0.45 | 0.45 | 0.45 | 0.45 | 0.45 | — | — |
| TATM (wt %) | — | — | — | — | — | — | 0.45 | — |
| TMPTMA (wt %) | — | — | — | — | — | — | — | 0.45 |
| DCP (wt %) | 0.95 | 0.95 | 0.95 | 0.95 | 0.95 | 0.95 | 0.95 | 0.95 |
| IRGANOX 1076 (wt %) | — | — | 0.29 | — | — | — | — | — |
| IRGANOX 1010 (wt %) | — | — | — | 0.16 | — | — | — | — |
| CYANOX 1790 (wt %) | 0.09 | — | — | — | — | — | — | — |
| IRGANOX 245 (wt %) | — | 0.11 | — | — | — | — | — | — |
| IRGANOX 1035 (wt %) | — | — | — | — | 0.17 | — | — | — |
| IRGANOX PS802 (wt %) | 0.14 | 0.14 | 0.14 | 0.14 | 0.14 | — | — | — |
| TBM-6 (wt %) | — | — | — | — | — | 0.15 | 0.15 | 0.15 |
| Total | 100.00 | 100.00 | 100.00 | 100.00 | 100.00 | 100.00 | 100.00 | 100.00 |
| Allyl/Active oxygen | 0.77 | 0.77 | 0.77 | 0.77 | 0.77 | 0.77 | 0.58 | 0.57 |

Analyze each of S17-S23 and CS9 according to the Test Methods provided above. Results are provided in Table 9, below.

TABLE 9

Properties of S17-S23 and CS9

|  | S17 | S18 | S19 | S20 | S21 | S22 | S23 | CS9 |
|---|---|---|---|---|---|---|---|---|
| ML (dN · m) | 0.20 | 0.19 | 0.20 | 0.21 | 0.21 | 0.19 | 0.19 | 0.19 |
| MH (dN · m) | 3.74 | 3.77 | 3.46 | 3.84 | 3.72 | 3.63 | 2.91 | 2.45 |
| MH − ML (dN · m) | 3.54 | 3.58 | 3.26 | 3.63 | 3.51 | 3.44 | 2.72 | 2.26 |

The results provided in Table 9 show that coagents other than TAIC (specifically, TAC and TATM) can achieve comparable curing potentials to TAIC. In contrast, CS9, which contains an acrylate-based coagent, does not achieve sufficient cure potential.

Example 6 (Comparative)

Prepare six additional Comparative Samples (CS10-CS15) according to the formulations provided in Table 10, below, using the same preparation method provided above in Example 2.

TABLE 10

Compositions of CS10-CS15

|  | CS10 | CS11 | CS12 | CS13 | CS14 | CS15 |
|---|---|---|---|---|---|---|
| LDPE (wt %) | 97.94 | 97.90 | 97.63 | 97.83 | 97.81 | 98.15 |
| DCP (wt %) | 1.70 | 1.70 | 1.70 | 1.70 | 1.70 | 1.70 |
| IRGANOX 1076 (wt %) | — | — | 0.45 | — | — | — |
| IRGANOX 1010 (wt %) | — | — | — | 0.25 | — | — |
| CYANOX 1790 (wt %) | 0.14 | — | — | — | — | — |
| IRGANOX 245 (wt %) | — | 0.18 | — | — | — | — |
| IRGANOX 1035 (wt %) | — | — | — | — | 0.27 | — |
| IRGANOX PS802 (wt %) | 0.22 | 0.22 | 0.22 | 0.22 | 0.22 | — |
| TBM-6 (wt %) | — | — | — | — | — | 0.15 |
| Total | 100.00 | 100.00 | 100.00 | 100.00 | 100.00 | 100.00 |

Analyze each of CS10-CS15 according to the Test Methods provided above. Results are provided in Table 11, below.

TABLE 11

Properties of CS10-CS14

|  | CS10 | CS11 | CS12 | CS13 | CS14 | CS15 |
|---|---|---|---|---|---|---|
| ML (dN · m) | 0.20 | 0.19 | 0.21 | 0.22 | 0.21 | 0.19 |
| MH (dN · m) | 3.79 | 3.64 | 3.18 | 3.94 | 3.61 | 3.88 |
| MH − ML (dN · m) | 3.59 | 3.45 | 2.97 | 3.72 | 3.40 | 3.69 |

The results provided in Table 11 show that conventional crosslinked polyethylene compounds achieve sufficient curing potential; however, higher levels of peroxide will result in increased methane generation and thus prolonged degassing periods.

The invention claimed is:

1. A process for preparing a degassed cable core having a crosslinked insulation layer, said process comprising:
   (a) providing an initial cable core comprising:
      (i) a conductor;
      (ii) a first polymeric semiconductive layer;
      (iii) an initial insulation layer comprising a crosslinkable polymeric composition which comprises an ethylene-based polymer, an organic peroxide, an antioxidant, and a polyallyl crosslinking coagent;
      (iv) a second polymeric semiconductive layer;
   (b) subjecting said initial cable core to a crosslinking process sufficient to crosslink at least a portion of said crosslinkable polymeric composition to thereby produce said cable core having a crosslinked insulation layer, and
   (c) subjecting said cable core having a crosslinked insulation layer to a degassing process at a degassing temperature, a degassing pressure, and for a degassing time period to produce a degassed cable core,
   wherein said polyallyl crosslinking coagent and said organic peroxide are present in said crosslinkable polymeric composition in amounts sufficient to provide an allyl-to-active oxygen molar ratio of less than 1.2, based on the allyl content of said polyallyl crosslinking coagent and the active oxygen content of said organic peroxide,
   wherein said crosslinkable polymeric composition exhibits at least 25% less coagent sweat out in parts per million (ppm) when stored at 23° C. for a period of two weeks relative to coagent sweat out in ppm of a reference crosslinkable polymeric composition which has the same composition as said crosslinkable polymeric composition except that said reference crosslinkable polymeric composition has an allyl-to-active oxygen molar ratio of 1.2, wherein sweat out is determined using pelletized samples according to Sweat Out procedure,
   wherein said crosslinkable polymeric composition exhibits at least 5% less antioxidant sweat out in parts per million (ppm) and at least 10% less organic peroxide sweat out in ppm when stored at 23° C. for a period of two weeks relative to antioxidant sweat out in ppm and organic peroxide sweat out in ppm, respectively, of a reference crosslinkable polymeric composition which has the same composition as said crosslinkable polymeric composition except that said reference crosslinkable polymeric composition has an allyl-to-active oxygen molar ratio of 1.2, wherein sweat out is determined using pelletized samples according to Sweat Out procedure,
   wherein when said crosslinked insulation layer is subjected to a degassing process at 70° C. and standard pressure, said crosslinked insulation layer exhibits a reduction in degassing time of at least 50% to reach a methane content of 200 ppm relative to a reference crosslinked insulation layer having the same composition except that the reference crosslinked insulation layer contains no polyallyl crosslinking coagent and twice the amount of organic peroxide on a weight basis.

2. The process of claim 1, wherein said crosslinked insulation layer has a cure potential (MH) in deciNewton-meter (dN-m) that is at least 75% of the cure potential in dN-m of said reference crosslinked insulation layer, wherein cure potential is maximum torque (MH) as measured by Moving Die Rheometer test method.

3. The process of claim 1, wherein when said crosslinked insulation layer is subjected to a degassing process at 70° C. and standard pressure, said crosslinked insulation layer exhibits a reduction in degassing time of at least 40% to reach a methane content of 150 ppm relative to said reference crosslinked insulation layer.

4. The process of claim 1, wherein when said crosslinked insulation layer is subjected to a degassing process at 70° C. and standard pressure, said crosslinked insulation layer exhibits a reduction in degassing time of at least 30% to reach a methane content of 93 ppm relative to said reference crosslinked insulation layer.

5. The process of claim 1, wherein said crosslinkable polymeric composition has an allyl-to-active oxygen molar ratio of 1.0 or less.

6. The process of claim 1, wherein said organic peroxide is present in said crosslinkable polymeric composition in an amount of less than 1.1 weight percent based on the total weight of said crosslinkable polymeric composition; wherein said polyallyl coagent is present in said crosslinkable polymeric composition in an amount of at least 0.3 weight percent based on the total weight of said crosslinkable polymeric composition; wherein said ethylene-based polymer is present in said crosslinkable polymeric composition in an amount ranging from 50 to 98.9 weight percent based on the total weight of said crosslinkable polymeric composition.

7. The process of claim 1, wherein said polyallyl crosslinking coagent is a triallyl compound; wherein said organic peroxide is a mono-functional peroxide.

8. The process of claim 1, wherein said polyallyl crosslinking coagent is selected from the group consisting of triallyl isocyanurate ("TAIC"), triallyl cyanurate ("TAC"), triallyl trimellitate ("TATM"), and mixtures of two or more thereof; wherein said organic peroxide is selected from the group consisting of dicumyl peroxide, bis(t-butyl-peroxy isopropyl)benzene, and combinations thereof; wherein said ethylene-based polymer is low-density polyethylene ("LDPE").

9. A power cable prepared by the process of claim 1.

* * * * *